United States Patent
Florent et al.

(10) Patent No.: US 7,340,108 B2
(45) Date of Patent: Mar. 4, 2008

(54) MEDICAL VIEWING SYSTEM AND METHOD FOR SPATIALLY ENHANCING STRUCTURES IN NOISY IMAGES

(75) Inventors: Raoul Florent, Ville d'Avray (FR); Lucile Nosjean, Rueil-Malmaison (FR); Pierre Lelong, Nogent sur Marne (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 714 days.

(21) Appl. No.: 10/497,433

(22) PCT Filed: Dec. 2, 2002

(86) PCT No.: PCT/IB02/05081

§ 371 (c)(1),
(2), (4) Date: Jun. 2, 2004

(87) PCT Pub. No.: WO03/049032

PCT Pub. Date: Jun. 12, 2003

(65) Prior Publication Data

US 2005/0058363 A1    Mar. 17, 2005

(30) Foreign Application Priority Data

Dec. 7, 2001    (EP)    .................. 01403180

(51) Int. Cl.
    *G06K 9/40*    (2006.01)
(52) U.S. Cl. ...................... 382/275; 382/260

(58) Field of Classification Search ................ 382/130, 382/284, 294, 287, 266, 263, 275, 260; 623/1.11; 606/7
See application file for complete search history.

(56) References Cited

U.S. PATENT DOCUMENTS

| | | | |
|---|---|---|---|
| 5,687,251 A | | 11/1997 | Erler et al. |
| 5,982,915 A | * | 11/1999 | Doi et al. .................. 382/130 |
| 6,941,323 B1 | * | 9/2005 | Galperin .................. 707/104.1 |

FOREIGN PATENT DOCUMENTS

| | | |
|---|---|---|
| EP | 0850659 | 7/1998 |
| EP | 1057455 | 6/2000 |
| WO | WO0131583 | 5/2001 |
| WO | WO0134026 | 5/2001 |

OTHER PUBLICATIONS

Close et al., "Improved image guidance of coronary stent deployment", Medical Imaging 2000, pp. 301-304.*
"Deformable Boundary Detection of Stents in Angiographic Images", by Ioannis Kompatsiaris et al. in IEEE Transactions on Medical Imaging, vol. 19, No. 6, Jun. 2000, pp. 652-662.

* cited by examiner

*Primary Examiner*—Matthew C. Bella
*Assistant Examiner*—Randolph Chu

(57) ABSTRACT

A viewing system and method comprises an extracting device, a spatial enhancement device, and a display device. The extracting device (1) extracts features related to an object of interest in images of a sequence. The spatial enhancement device (2) includes a ridge filter modulated by factor to enhance the object of interest to the exclusion of background objects. The display device (54) displays the processed images (15, 45) of the enhanced registered object of interest on a faded background.

16 Claims, 5 Drawing Sheets

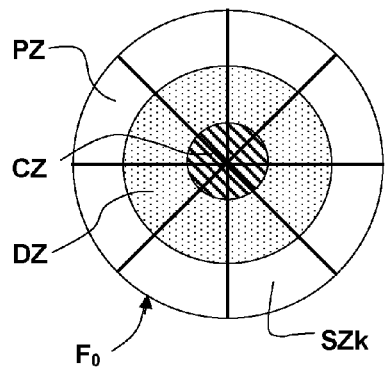
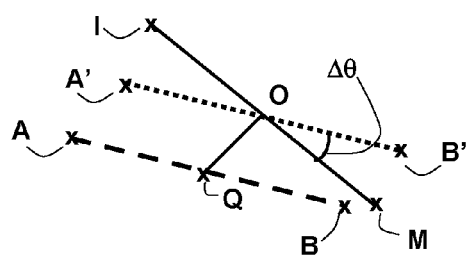
FIG.1C        FIG.1D
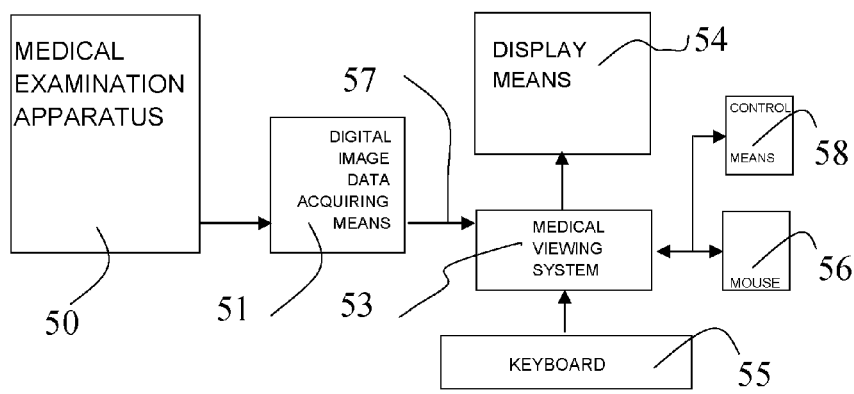
FIG.4

MEDICAL VIEWING SYSTEM AND METHOD FOR SPATIALLY ENHANCING STRUCTURES IN NOISY IMAGES

The invention relates to a viewing system having spatial enhancement means for enhancing objects of interest represented in a sequence of noisy images and for displaying the sequence of enhanced images. The invention also relates to a computer executable image processing method to be used in said system. The invention further relates to a medical examination apparatus coupled to such a system. The invention finds for example its application in medical imaging systems, for enhancing thin objects of interest such as stents and artery walls in angiograms.

A method for extracting stents in medical images is already known from the publication entitled "Deformable Boundary Detection of Stents in Angiographic Images", by Ioannis Kompatsiaris et alii, in IEEE TRANSACTIONS ON MEDICAL IMAGING, VOL.19, No. 6, JUNE 2000, pages 652-662. This document describes an image processing method for deformable boundary detection of medical tools, called stents, in angiographic images. A stent is a surgical stainless steel coil that is placed in the artery in order to improve blood circulation in regions where a stenosis has appeared. Assuming initially a set of three-dimensional (3-D) models of stents and using perspective projection of various deformations of the 3-D model of the stent, a large set of two-dimensional (2-D) images of stents is constructed. These synthetic images are then used as a training set for deriving a multi-variate density estimate based on eigenspace decomposition and formulating a maximum-likelihood estimation framework in order to reach an initial rough estimate for automatic object recognition. The silhouette of the detected stent is then refined by using a 2-D active contour (snake) algorithm, integrated with an iterative initialization technique, which takes into consideration the geometry of the stent.

As disclosed in the cited publication, when a narrowing called stenosis is identified in a coronary artery of a patient, a procedure called angioplasty may be prescribed to improve blood flow to the heart muscle by opening the blockage. In recent years, angioplasty increasingly employs a stent implantation technique. This stent implantation technique includes an operation of stent placement at the location of the detected stenosis in order to efficiently hold open the diseased vessel, as illustrated by FIG. 2 of the cited publication. Stent placement helps many patients to avoid emergency heart bypass surgery and/or heart attack (myocardial infraction). The stent, as illustrated by FIG. 1 of the cited publication, is a small, slotted, stainless steel tube cut by a precision laser for forming a coil. It is wrapped tightly around a balloon attached to a monorail introduced by way of a catheter and a guide-wire forming a device called balloon-tipped catheter. This balloon-tipped catheter is introduced into the artery through a small incision. Once in place, the balloon is inflated in order to expand the coil. Once expanded, the stent, which can be considered as a permanent implant, acts like a scaffold keeping the artery wall open. This allows more blood flow to the heart muscle.

The stent, the monorail and the thin guide-wire are observed in noisy fluoroscopic images. They show low radiographic contrast that makes evaluation of the placement and expansion of said stents at an accurate location very difficult. Also, during the operation of stent implantation, the monorail, with the balloon and stent wrapped around it, is moving with respect to the artery, the artery is moving under the influence of the cardiac pulses, and said artery is seen on a background that is moving under the influence of the patient's breathing. These motions make the following of stent implantation under fluoroscopic imaging still more difficult to visualize. In particular, these motions make zooming inefficient because the object of interest may get out of the zoomed image frame. Clinical problems are associated with inadequate placement or expansion of the stent, and gap or overlap between several stents. Studies revealed that more than eighty percent of stents might be insufficiently dilated despite an apparently angiographically successful deployment. Inadequately expanded stents can locally disrupt blood flow and cause thrombosis.

The method that is disclosed in the cited publication deeply relies on the identification of the stent in the angiographic images. This known method has steps of forming sets of 3-D models of stents, steps of constructing sets of 2-D images from the 3-D models and steps of matching the 2-D models to the 2-D images of the stent in the cardiograms. This method would present a calculation load that is actually too heavy for real time processing of a sequence of images needed in the intervention phase of stent implantation. Also, the practitioners are more and more demanding about the resolution of the images. So, the proposed method may be preferably only used in a post-intervention phase.

Instead, it is an object of the invention to propose a viewing system that has spatial filtering means to process images in real time in order to be used for instance during an intervention phase. For visualizing an intervention, this system has means to solve the problems of extracting specific features called markers related to an object of interest, which permits of accurately locating said markers and deriving the location of the object of interest. For example, in the intervention of stent implantation, the system has means to extract balloon-markers that are attached to the monorail, which permits of detecting the location of the balloon with or without a stent wrapped around it. This system having means for processing the images in real time, further permits of positioning a balloon with respect to the stenosed zone of the artery, for example for inflating the balloon so as to expand the lumen of the artery or for inflating the balloon and deploying the stent wrapped around it.

It is to be noted that according to the invention, the problems of detection of the location of the objects of interest are not solved by purely and directly extracting said objects of interest. For example in cardiology, these problems are not solved by merely and directly extracting the stent or the artery walls. Instead, these problems are solved by extracting features that do not pertain to the objects to be actually finally of interest for the practitioner such as stent or artery walls. As a matter of fact, as explained above, said objects are by nature badly contrasted, represented on an already noisy background and submitted to motions. According to the invention, the viewing system comprises means for acquiring a sequence of images representing an object of interest and related specific features called markers, and for first extracting the markers in order to derive the location of the related object of interest. The system further comprises means for enhancing the localized object of interest that is related to the markers. For example, in cardiology, the object of interest is the artery or the stent related to a couple of balloon-markers. The system has also display means for displaying the intervention in real time. It may be user activatable.

Such a system is claimed in claim 1 and in dependent claims. An image processing method to be used in the system, a program product to implement the steps of the method of the invention, and an examination apparatus associated to such a system are further claimed.

Embodiments of the invention are described hereafter in detail in reference to diagrammatic Figures wherein:

FIG. 1A to 1D are functional block diagrams of the system means;

FIG. 4 is a functional block diagram of a medical examination apparatus using the system of the invention.

The invention relates to a viewing system, and to a computer executable image processing method that is used in the viewing system, for enhancing an object of interest in a sequence of noisy images and for displaying the sequence of enhanced images. The viewing system and method have means to acquire, process and display the images in real time. The viewing system and the image processing method of the invention are described hereafter as a matter of example in an application to the medical field of cardiology. In said application, the object of interest is an organ such as an artery or a tool such as a balloon or a stent. These objects are observed during a medical intervention called angioplasty, in a sequence of X-ray fluoroscopic images called angiograms. The system and method may be applied to any other object of interest than a stent or a vessel in other images than angiograms. The object of interest may be moving with respect to the image referential, but not necessarily, and the background may be moving with respect to the object or to the image referential.

Figure 2A:
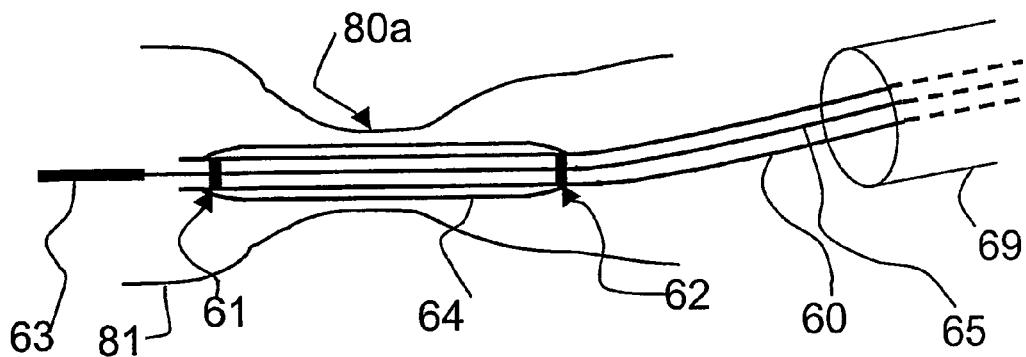
FIG. 2A to FIG. 2C illustrate intervention steps of angioplasty, with a device constituted by a catheter, a guide-wire and a monorail with a balloon; or by a catheter, a guide-wire and a monorail with a balloon and a stent wrapped around it.
Figure 2B:
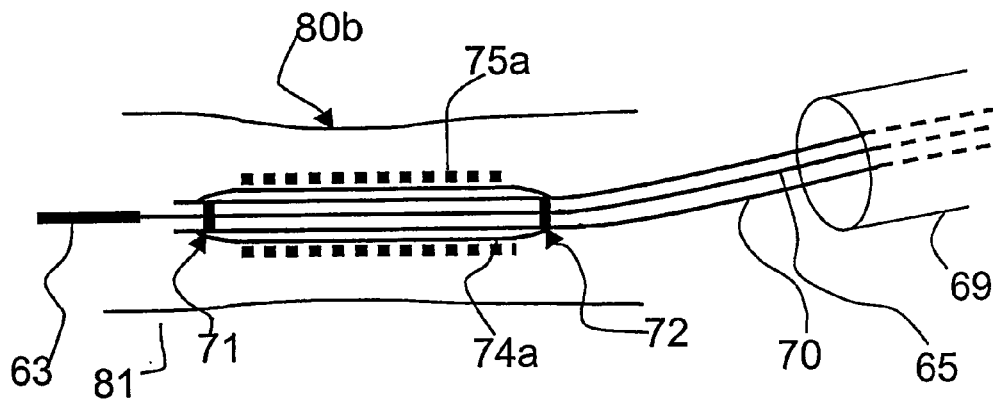
Figure 2C:
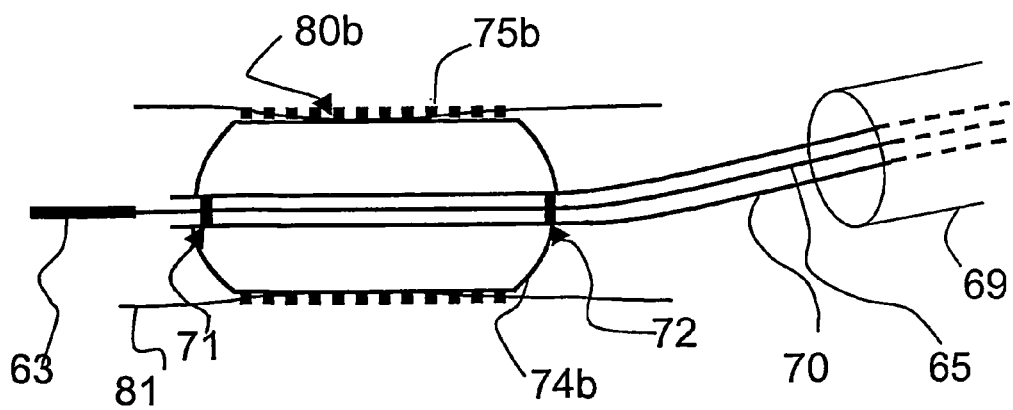

Referring to FIG. 2A to 2C, in the application described hereafter, the stent implantation is a medical intervention that usually comprises several steps for enlarging an artery at the location of a lesion called stenosis. In a preliminary step, the practitioner localizes the stenosis 80*a* in a patients artery 81 as best as possible in the medical images. Then, the medical intervention includes steps of:

A) Referring to FIG. 2B, using a catheter 69 and a thin guide-wire 65, introduction of a monorail 70 with a balloon 74*a* wrapped around its extremity, and with a stent 75*a* around said balloon 74*a*; and positioning said balloon with the stent at the location of the stenosis in the lumen 80*b* of the artery 81 using the balloon-markers 71, 72.

B) Referring to FIG. 2C, inflation of the balloon 74*a* to become the inflated balloon 74*b* in order to expand the coil forming the stent 75*a*, which becomes the expanded stent 75*b* embedded in the artery wall. Then, considering the expanded stent 75*b* as a permanent implant, removing the balloon 74*b*, the monorail 70, the guide-wire 65 and catheter 69.

These steps A), B) may be preceded by two steps for previously enlarging the artery at the stenosed location:

a) Referring to FIG. 2A, introduction in the artery 81, using a catheter 69, of a thin guide-wire 65 that extends beyond the extremity of the catheter 69, and passes through the small lumen 80*a* of the artery at the location of the stenosis; introduction of a first monorail 60, which is guided by said guide-wire 65, which has a first balloon 64 wrapped around its extremity, without stent; and positioning said first balloon 64 at the location of the stenosis 80*a* using the balloon-markers 61, 62.

b) Referring to FIG. 2A and FIG. 2B, inflation of this first balloon 64 for expanding the narrow lumen 80*a* of the artery 81 at the location of the stenosis to become the enlarged portion 80*b* of the artery; then, removal of the first balloon 64 with the first monorail 60.

The medical intervention called angioplasty is difficult to carry out due to badly contrasted medical images, where the stent and the artery walls are hardly distinguishable on a noisy background and are moreover submitted to motions. According to the invention, the viewing system comprises means for acquiring a sequence of images during the intervention, and for automatically processing and displaying said images in real time during said intervention. This system comprises first means applied to the original images for extracting and localizing the object of interest, which is usually moving with respect to the referential of the image, but not necessarily, the background being moving both with respect to said referential and with respect to the object. As the objects are hardly radio-opaque, they are preferably localized indirectly by localizing related markers. The extraction means are then first applied to extract the markers. This system further comprises processing means including at least a means for carrying out spatial filtering. This technique is efficient to enhance the object of interest because said object has previously been localized with respect to the markers. The spatial enhancement means are specifically adapted to the object of interest in order to provide sharp detail enhancement of the object of interest without enhancing features of the background or other unwanted features.

In the present example of application to cardiology, the user is the actor of the medical intervention and has the possibility to intervene during the image processing phases, for example while not moving the tool or tools. First of all, the user might choose a region of interest in the images. Besides, the user has at his disposal control means 58, shown in FIG. 4, to activate and control the image processing means. These control means comprise starting means and stopping means for the user to start the processing operation, to control the duration of the processing operation and to end the processing operation. In particular, the user may choose that the final processed images are registered or not, depending on whether the motion of objects is of importance for the diagnosis or not.

The object of interest are localized indirectly by localizing specific features such as the balloon-markers 61, 62 or 71, 72. The balloon-markers 61, 62, which are located on the monorail 60 at a given position with respect to the balloon 64, permit of determining the position of the first balloon with respect to the stenosed zone before expanding the balloon in the lumen of the artery, the balloon-markers 71, 72, which are located on the monorail 70 at a given position with respect to the balloon 74*a*, permit of determining the position of the stent 75*a* wrapped around the second balloon, before stent expansion, and of finally checking the expanded stent 75*b*.

Figure 1A:
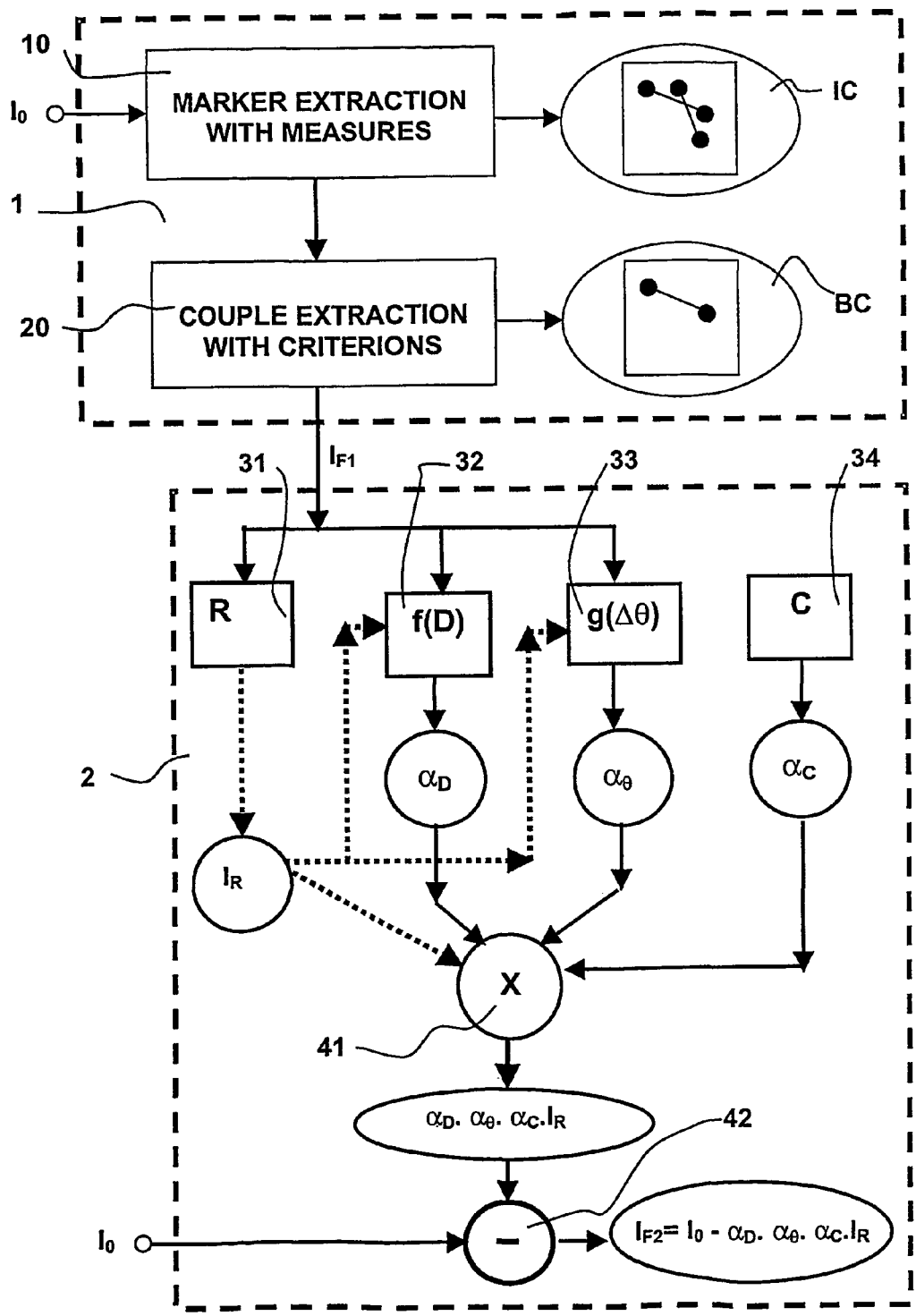
Figure 1B:
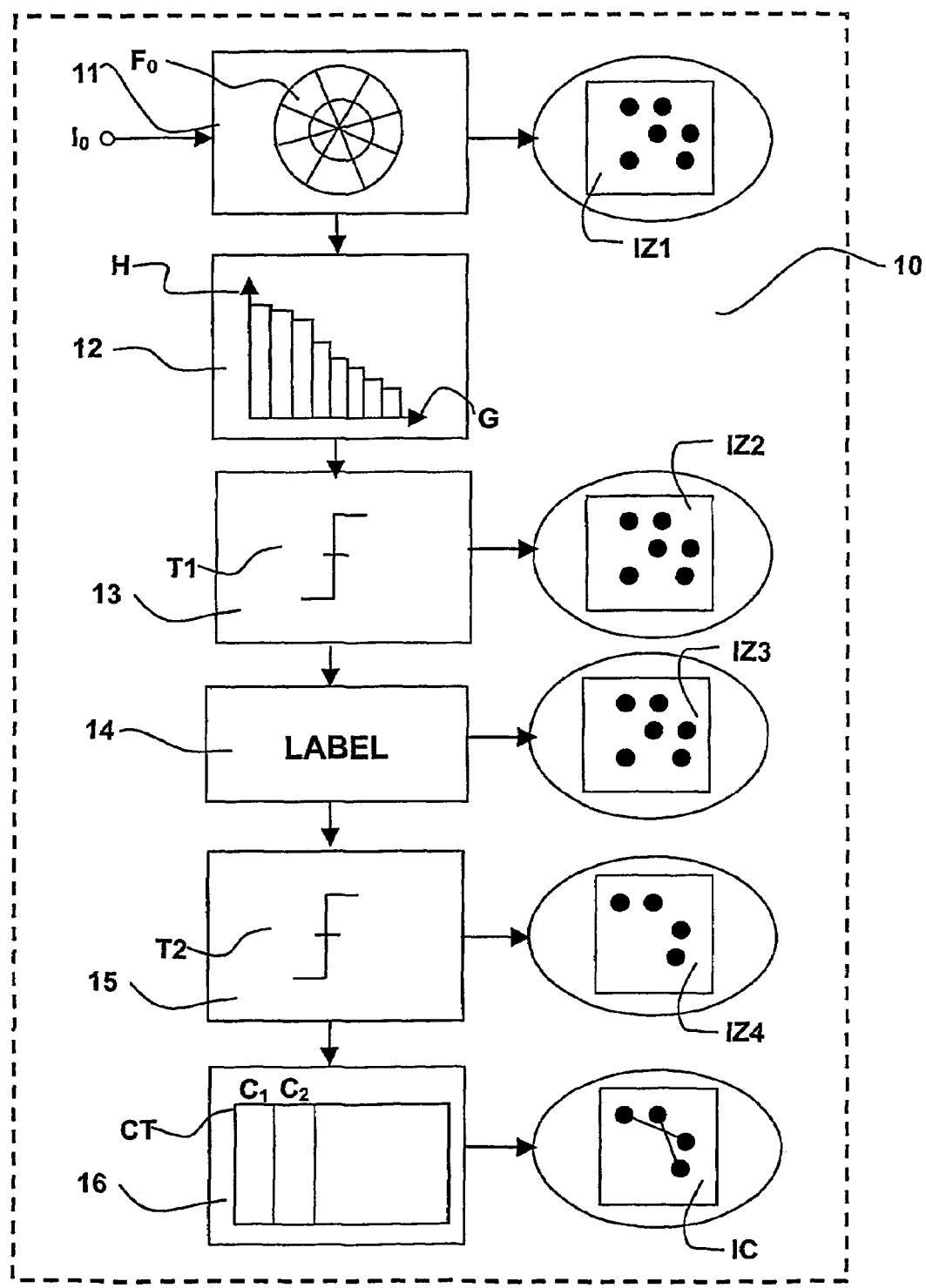

Referring to FIG. 1A to FIG. 1C, these specific features called markers are far better contrasted than the stent or vessel walls. The extracting means 1 are appropriate to accurately extract said markers from the original images $I_0$. These markers have a specific easily recognizable shape, and are made of a material highly contrasted in the images. Hence, they are easier to extract. However, it is to be noted that these specific features do not pertain to the badly contrasted balloon, stent or vessel walls, which are the objects that are actually finally of interest for the practitioner. The balloon-markers 61, 62 or 71, 72 pertain neither to the vessel walls 81 nor to the stent 75a since they pertain to the monorail 60 or 70. The system extracting means 1 permits of accurately deriving the location of the balloons 64, 74a, 74b, since the balloon-markers have a specific location with respect to the balloons. Also, the stents 75a, 75b are accurately localized, since the stents have a specific location with respect to the balloon-markers though said stents are not attached to said balloon-markers.

The extraction means 1 for marker extraction are far better efficient when at least two markers related to the same object of interest are to be extracted. This fact is particularly interesting since the monorail, which supports the balloon and the stent wrapped around it, is equipped with two markers disposed at each extremity of the balloon. The balloon-markers are particularly recognizable because they constitute punctual zones, practically black or at least dark in the fluoroscopic images. They are also very similar in shape. The extraction means comprises means for operating a series of elementary measures, each measure being representative of a given characteristic of the markers or of couples of markers, and means for further combining said elementary measures in order to constitute a criterion of decision able to yield a decision of identification and extraction.

In the example of cardiology, the markers are in a coronary. The X-ray images are 2-D projections that can be formed easily enough parallel to the coronary. So the distance between the markers remains approximately constant with a maximum variation of about 20% over a sequence of images. The actual distance between markers before implantation is known accurately from the manufacturer indications. So, the distance IM between markers during the intervention can be estimated knowing the actual distance and the maximum variation. The viewing system has means to transform said estimated distance IM into a number of pixels.

Referring to FIG. 1A, the extraction means 1 first comprises elementary measures 10 performed to permit of extracting candidates of markers in order to determine candidates of couples of markers. The extraction means 1 further comprises couple extraction means 20 for extracting a best couple of markers.

Referring to FIG. 1B, in the marker extraction means 10, the elementary measure means to characterize the candidates of markers comprise:

A first measure means 11 that selects punctual dark zones contrasting on a brighter background: This measure is provided by filter means, denoted by $F_0$. In a preferred example, referring to FIG. 1C, an appropriate filter comprises three circular concentric zones, including a central zone CZ, a dead zone DZ and a peripheral zone PZ. The filter $F_0$ is further divided into n sectoral zones SZ covering 360° and numbered 1 to n. A current sectoral zone $Z_k$ is numbered k with $1 \leq k \leq n$. The first measure consists in scanning a current image of the sequence of images in order to look for a punctual dark zone. A punctual dark zone can be detected when said punctual dark zone is centered in the filter. When a punctual dark zone is centered, it occupies the central zone CZ of the filter, and it occupies possibly a part of the dead zone DZ. The first measure is based on the estimation of contrast of intensity between the central zone CZ and the peripheral zone PZ. Said estimation of contrast may be carried out by estimating the difference of the average of intensities between the central zone CZ and peripheral zone PZ. This simple measure would conduct to a linear estimation of the contrast. In order to refine the result of this estimation, the first measure is actually carried out by calculating the minimum of the n averages of intensities determined in the n peripheral sectoral zones separately. These minimum of intensities are denoted by:

$I_{Pk}$=average of intensity in the peripheral sectoral zone numbered k, and $I_{CZ}$=average of intensities in the central zone CZ.

The final measure provided by the filter $F_0$ is:

$$I_{F0} = \min_k (I_{Pk}) - I_{CZ}$$

This measure $I_{F0}$ is determined by scanning each pixel of the original image $I_0$ with the filter $F_0$. It provides an enhanced image, denoted by IZ1, of punctual dark zones, denoted by Z, where all other structures have disappeared, to the exception of said punctual dark zones that are now candidates to constitute markers.

A second measure means 12 that is a histogram means denoted by H: In this image IZ1, each pixel has a gray level. From the image IZ1, an histogram is constructed, which represents the different numbers H of pixels corresponding to each gray level value G. Toward the right of the axis G in FIG. 1B, are the high gray level values; and toward the left of axis G are the low gray level values. For each gray level value G, the height H of the box represents the number of pixels to be found having said gray level value. Since the average size of punctual dark zone Z is determined by the characteristics of the filter $F_0$, it is possible to estimate the size of a punctual zone in pixels. Assuming that the size of a punctual zone is p pixels, an assuming that for example a number z of zones is to be found in the image IZ1, it is searched a number of p.z (p times z) pixels that have the highest gray levels. The histogram H, as shown in FIG. 1B, permits of accumulating the number of pixels in adjacent boxes, starting from the right of axis G, until the estimated number of p.z pixels is reached for the image, i.e. for z zones of each p pixels, while choosing the p.z pixels having the highest gray levels i.e. the pixels in the boxes on the right of the G axis. The histogram H permits of determining a gray level $G_H$, which yields the p.z pixels.

A third measure means 13 that is a threshold means denoted by $T_1$: A first intensity threshold $T_1$ is then applied to the image IZ1. The threshold $T_1$ is chosen equal to the previously determined gray level $G_H$. That permits of selecting in the image IZ1 said number p.z of pixels having at least a gray level equal to $G_H$. A new image is formed where the intensities and the coordinates of the pixels are known, thus forming the image of points IZ2.

A fourth measure means 14, called label means, that performs a connexity analysis on pixels previously selected for the image IZ2, in order to connect pixels pertaining to a same punctual dark zone Z. The labeling means 14 provides a number of labeled punctual dark zones in a new image IZ3.

A fifth measure means 15 that is a second threshold means $T_2$: This second threshold $T_2$ is applied for example on the intensities of the pixels of the image IZ3 of labeled zones and on the diameter of the zones in order to select the best labeled zones. For example $T_2$ equals a product of a given intensity by a given diameter, for selecting a number of remaining punctual zones having the highest intensities and the best shapes for constituting markers, thus yielding an image of markers IZ4.

A fifth measure means 16 that is a table, denoted by CT: This table CT of possible couples C1, C2, of selected punctual dark zones is constructed based on the a-priori known distance IM between the markers, with an incertitude of for example 20%. The table CT provides an image IC of the possible marker couples C1, C2, Referring to FIG. 1A, and based on the image IC of possible marker couples, the extraction means 1 further comprises couple extraction means 20 for extracting the best couple of markers based on criterions among which:

A criterion of distance: the distance between the markers of the best couple must be very near the a-priori known distance IM with a given incertitude.

A criterion of strength: the strength of the best couple must be larger than the strength of the other couples. The strength of a given couple may be determined as the average of enhanced intensities yielded by filter $F_0$.

A criterion of similarity: the markers of the best couple must be very similar structures. The similarity of the markers of possible couples is determined. Once the punctual dark zones Z of p pixels are determined, their centroids are calculated. Small regions of interest, denoted by ROI are defined around each centroid, as represented by white squares in FIG. 3B. For each possible couple, correlation is calculated between the corresponding ROIs. Strong correlation is an indication that the two strongly correlated ROIs correspond to the markers of a couple of markers.

A criterion of continuous track: The markers of a couple are carried by a monorail, which is guided by a guide-wire. The guide-wire is more or less visible. However, it may be detected by a ridge filter. So, if the markers of a possible couple are situated on a track corresponding to a ridge joining them, this constitutes an other indication that the two zones located at the extremities of the continuous track correspond to a couple of markers. Such a continuous track may be qualified by estimating the average ridgeness along the path joining the two zones. The measure of average ridgeness must provide a track that has a shape as near as the shape of a segment or of a parabola as possible. The evaluation of a continuous track can alternately be performed by using a fast marching technique.

Criterion of motion: The markers being in the coronary artery are moving rapidly with respect to the cardiac pulses. False alarms, i.e. dark punctual zones that pertains to the background, are moving much more slowly with the patient's breathing. In order to eliminate these possible false alarms, a temporal difference is performed between two succeeding images of the sequence. This difference provides a measure of temporal contrast. The measure of temporal contrast permits of detecting the dark punctual zones showing an important temporal contrast. This measure is also an indication of possible couple of markers, since false alarms have a feebler temporal contrast.

All the above-described criterions are combined using a fuzzy logic technique for deriving a composite measure. The higher the composite measure, the higher the probability of the presence of a couple of marker. The highest composite measure permits of selecting the best couple of markers from the image of couples IC issued from the marker extraction means 1. The coordinates of said markers are determined. The resulting information that comprises the intensities of the original image $I_0$ and the coordinates of said markers of the best couple is denoted $I_{F1}$ and used for further processing in the enhancement means 2 that comprises spatial filtering means.

Referring to FIG. 1A, a spatial filtering means 2 is applied to the original image intensities with marker coordinates information $I_{F1}$. The spatial filtering means 2 has for an object to enhance the borders or boundaries of the objects of interest such as the walls of the stenosed artery and/or the borders of the stent while eliminating at the same time the features of the background. These objects of interest are approximately located between the already detected balloon-markers. As described above, the actual distance between the balloon-markers may be approximated, in centimeters or in pixels, from a measure provided by the stent manufacturer in function of the reference of the stent. The clinician has the knowledge of the stent diameter, which is also provided by the stent manufacturer, and has an assumption of the diameter of the stenosed artery, which can be estimated as a fraction of the approximated distance between the balloon-markers. Referring to FIG. 3B, a region of interest is defined in the original image, where the markers have previously been detected. In FIG. 3B, this region is delimited by a doted line. The segment IM joins the two markers as shown in FIG. 1D. The artery walls or stent borders are ridge structures, represented for example as dark lines on a brighter background in the X-ray image. Referring to FIG. 1A, these ridge structures are enhanced by using a conventional ridge enhancement means such as a ridge filter 31, denoted by R. However, the conventional ridge filter R also enhances numerous parasitic features of the background in addition to the object of interest. In order to eliminate said parasitic features, according to the invention, the conventional filter R is modulated by a number of weighting factors. Hence, candidate points Q are first detected by the conventional ridge filter R, then the intensities of the points Q are submitted to weighting factors, among which:

A first weighting factor $\alpha_D$ that is based on the distance of a ridge point Q located on a detected ridge structure AB, regarded as a candidate to be enhanced, to the segment IM previously defined, joining the markers. As illustrated by FIG. 1D, this distance is denoted by D(Q, IM). A weighting function f(D) shown in 32 on FIG. 1A, is defined so as this function value approaches 1 when the value D(Q, IM) is approximately equal to the value of the stent radius or of the artery radius, and this function value decreases as the value D(Q, DM) is farer and farer from the radius value of the stent or of the artery. Hence, the first weighting factor is given by:

$$\alpha_D = f[D(Q, IM)]$$

This weighting factor permits of favoring the points around the segment IM and disfavoring the points of the background.

A second weighting factor $\alpha_\theta$ that is based on the direction of a detected ridge AB that is the candidate to be enhanced. The conventional ridge filter R is apt to provide the direction of the candidate ridge structure. As illustrated by FIG. 1D, the angle between the parallel A'B' of the candidate ridge structure AB passing by the center O of the segment IM and the previously defined segment IM is measured. This angle is denoted by $\Delta(\theta_Q, \theta_{IM})$. A weighting function $g(\Delta\theta)$ shown in 33 in FIG. 1A, is defined so as this function value approaches 1 when the angle value $\Delta(\theta_Q, \theta_{IM})$ is approximately equal to zero, and this function value increases as the angle value $\Delta(\theta_P, \theta_{IM})$ increases toward the value $\pi/2$. Hence, the second weighting factor is given by:

$$\alpha_\theta = g[\Delta(\theta_P, \theta_{IM})].$$

This weighting factor permits of favoring the points located on ridge structures parallel to the segment IM and disfavoring the points of the background.

A third weighting factor $\alpha_C$, is merely defined from a constant C, as shown in 34 in FIG. 1A. Other weighting factors may be defined in function of the intensity, shape and other characteristics of the structure to be extracted.

Having defined these weighting factors, the enhancing means 2 have multiplying means 41 for applying these factors to the intensity $I_R$ of the current pixel filtered by the conventional ridge filter R, yielding a weighted intensity of the form:

$$\alpha_C \alpha_\theta \alpha_D I_R$$

Then, the enhancing means 2 uses the weighting intensity for enhancing the original image $I_0$ according to a formula, where $I_R$ is the intensity of the current pixel filtered by the conventional ridge filter R, where 42 is a difference means to yield the difference between $I_0$ and the weighted intensity $\alpha_C \alpha_\theta \alpha_D I_R$, and where $I_{F2}$ is the intensity of the current pixel at the exit of the spatial enhancing means 2 according to the invention, so as:

$$I_{F2}=I_0-\alpha_C\alpha_\theta\alpha_D I_R$$

Other formula may be used by those skilled in the art according to the object of interest to enhance and the features to eliminate.

According to the invention, the spatial enhancing means 2, as defined by a formula of the kind that is proposed above, constitutes a new ridge filter means $F_2$, which is completely adapted to the specific structures to be enhanced in the application to cardiology or in any application where similar structures are to be found in objects of interest. This new ridge filter enhances the points around the segment IM and at the same time eliminates the points of the background and the ridge features of the background. In the application to angioplasty, this completely adapted ridge filter $F_2$ permits for example of checking the proper expansion of the lumen of the artery after balloon inflation or permits of checking proper stent expansion.

Figure 3A:
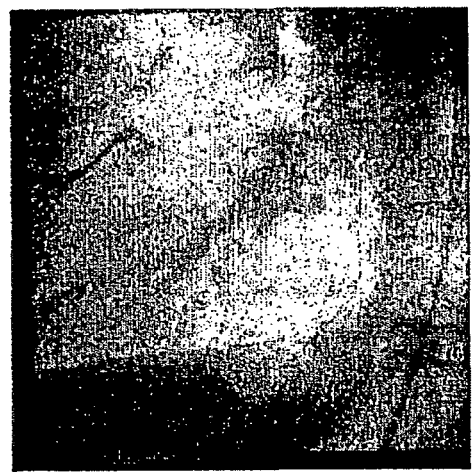
FIG. 3A shows an original angiogram.
Figure 3B:
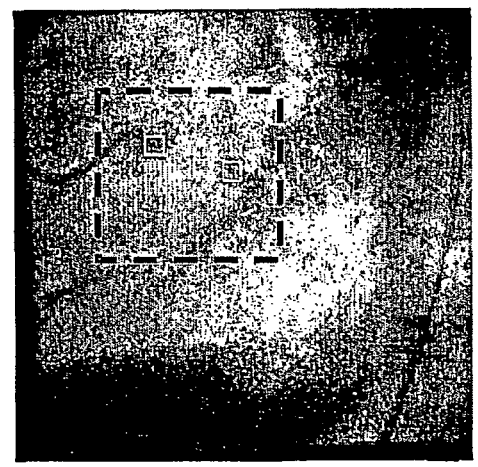
FIG. 3B shows two zones of detected markers and one region of interest.
Figure 3C:
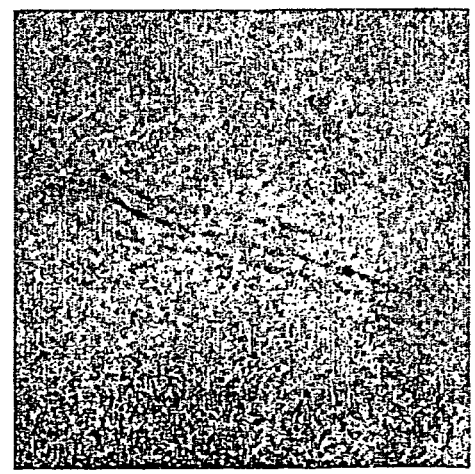
FIG. 3C shows a processed image with zooming on an enhanced object of interest on a filtered background.

FIG. 3A shows an original image of a medical sequence representing a catheter, a guide wire, a balloon with balloon-markers (as two small dark points) and an artery on a background of other organs. The visualization of the objects of interest (balloon and artery) is very difficult. Even the balloon-markers are hardly visible. FIG. 4B shows the original image with zones delimited in white, which are for the determination of the punctual dark zones. The doted line represents the frame of the region of interest for enhancing the candidate ridge. In FIG. 3C, the image has been processed according to the invention: hence the objects of interest are enhanced and the background is filtered.

For improving the comfort of the clinician during the intervention, the markers may be temporally registered with respect to the frame of the image, by matching corresponding markers of a current image and of an image of reference in the sequence of images. The marker registration permits of further registering the objects of interest, which practically do not move with respect to the markers. Thus, the object of interest may be zoomed, as shown in FIG. 3C, without said object shifting out of the image frame. Also, temporal filtering means may be used in combination with the means of the invention to further improve the images of the sequence.

The invention also relates to a computer executable image processing method to be used in a system as above described, for visualizing in real time a medical intervention that comprises moving and/or positioning a tool in a body organ, comprising steps of acquiring a sequence of images, steps of processing said images and steps of displaying the images for the user to position the tool in the organ at a specific location and check whether the medical intervention stages are successfully carried out. This method comprises steps of determining the marker location information for deriving the location of the objects of interest. This method has further steps for enhancing the objects of interest while eliminating features of the background using an adapted ridge filter of the invention.

FIG. 4 shows a diagram of a medical examination apparatus 50. The apparatus has means 51 for acquiring digital image data of a sequence of images, and is coupled to a medical viewing system 53 as described above, for processing these data according to the processing method cited above. The medical viewing system is generally used in the intervention room or near the intervention room for processing real time images. Should steps of the present method be applied on stored medical images, for example for estimating medical parameters, the system for processing the data of the stored images would be called medical viewing station. The medical examination apparatus provides the image data by connection 57 to the system 53. The system provides processed image data to display and/or storage means. The display means 54 may be a screen. The storage means may be a memory MEM of the system 53. Said storage means may be alternately external storage means. This image viewing system 53 may comprise a suitably programmed computer, or a special purpose processor having circuit means such as LUTs, Memories, Filters, Logic Operators, that are arranged to perform the functions of the method steps according to the invention. The system 53 may also comprise a keyboard 55 and a mouse 56. Icons may be provided on the screen to be activated by mouse-clicks, or special pushbuttons may be provided on the system, to constitute control means 58 for the user to start, to control the duration or to stop the processing means of the system at chosen phases.

The invention claimed is:

1. A viewing system for enhancing objects of interest represented on a background in a sequence of noisy images and for displaying the sequence of enhanced images, comprising acquisition means for acquiring the sequence of images and processing means for processing the images wherein:

extracting means (1) for extracting punctual features related to an object of interest in an image of the sequence and deriving the location of said object from a location of said punctual features;

spatial filtering means (2) for enhancing ridge features of the object of interest while eliminating the features of the background, wherein the spatial filtering means enhances ridge features specific to the object of interest as a function of (i) a distance from a point located on a candidate ridge with respect to a segment that joins two extracted punctual features and (ii) an angle of the candidate ridge with respect to the segment; and display means (54) for displaying the processed images of the enhanced object of interest on the filtered background.

2. The system of claim 1, having control means (58) for a user to activate, to control a duration or to stop the processing means at a selected stage in the sequence of images.

3. The system of one of claim 1, wherein the spatial filtering means further comprises:

ridge filtering means (31) for extracting ridges in the image;

modulating means (32, 33, 34) that modulates the ridge filtering means for enhancing ridge features specific to the object of interest and for excluding ridge features specific to the background.

4. The system of claim 3, wherein the modulating means comprises:
weighting factor means (32,33,34) for favoring ridge features specific to the object of interest and disfavoring ridge features specific to the background; and
combination means (41) for applying the modulating means to the ridge filter means.

5. The system of claim 4, wherein the filtered image is the difference (42) between an original image and a result of the modulated ridge filter.

6. A viewing system for enhancing objects of interest represented on a background in a sequence of noisy images and for displaying the sequence of enhanced images, comprising acquisition means for acquiring the sequence of images and processing means for processing the images wherein:
extracting means (1) for extracting punctual features related to an object of interest in an image of the sequence and deriving the location of said object from a location of said punctual features;
spatial filtering means (2) for enhancing ridge features of the object of interest while eliminating the features of the background; and
display means (54) for displaying the processed images of the enhanced object of interest on the filtered background, wherein, a couple of punctual features, called couple of markers, is related to the object of interest, and wherein the extracting means (1) comprises:
a marker extraction means (10) for filtering and enhancing punctual dark zones as candidates for forming markers and a couple extraction means (20) for yielding a decision based on criterion means for determining the markers forming the best couple of markers that is related to the object of interest.

7. The system of claim 6, wherein the decision criterion is a combination of several criterions relating to a distance of the markers, a strength of the couple, a similarity of the markers in the couple, a continuity of a track between the markers, a similarity of motion of the markers that is substantially different from a motion of features in the background.

8. The system of claim 7, wherein:
the marker extraction means (10) comprise a filter (11) for filtering and enhancing punctual dark zones as candidates for forming markers, said filter comprising three circular concentric zones divided into sectoral zones and wherein said filter evaluates a contrast between a central zone and a minimum among average intensities of pixels estimated in each peripheral sectoral zone separately in order to provide an image where the punctual dark zones are enhanced while all other structures are eliminated.

9. The system of claim 8, wherein the marker extraction means further comprise first threshold means (12, 13) to select pixel candidates for the markers, based on pixel intensity, a number of pixels per zone and a number of zones, labeling means (14) to form zone candidates from the pixel candidates and second threshold means (15) to select best marker candidates, based on intensity and shape of the zone candidates, and means (16) to form couple candidates from selected best marker candidates based on an a-priori known distance between corresponding markers with a given incertitude.

10. A viewing system for enhancing objects of interest represented on a background in a sequence of noisy images and for displaying the sequence of enhanced images, comprising acquisition means for acquiring the sequence of images and processing means for processing the images wherein:
extracting means (1) for extracting punctual features related to an object of interest in an image of the sequence and deriving the location of said object from a location of said punctual features;
spatial filtering means (2) for enhancing ridge features of the object of interest while eliminating the features of the background, wherein the spatial filtering means comprises:
ridge filtering means (31) for extracting ridges in the image;
modulating means (32, 33, 34) that modulates the ridge filtering means for enhancing ridge features specific to the object of interest and for excluding ridge features specific to the background, wherein the modulating means comprises:
weighting factor means (32,33,34) for favoring ridge features specific to the object of interest and disfavoring ridge features specific to the background; and
combination means (41) for applying the modulating means to the ridge filter means; and
display means (54) for displaying the processed images of the enhanced object of interest on the filtered background, wherein the weighting factor means for modulating the ridge filtering means (31) comprises:
a weighting factor means (32) based on a distance from a point of a candidate ridge to a segment joining the markers of a couple, which favors points located around said segment;
a weighting factor means (33) based on an angle of a candidate ridge with the segment joining said couple of markers, that favors ridges parallel to the segment joining said couple;
and occasionally a factor (34) that is a constant;
and wherein these factors are multiplied by multiplying means (41) to an intensity issued from the ridge filter for modulating the ridge filter intensity.

11. The system of claim 1, further comprising registration means to temporally register markers with respect to a referential of the image and thus register the object of interest related to the markers.

12. The viewing system of claim 1, for displaying a sequence of medical images of a medical intervention that comprises moving and/or positioning a tool called a balloon (64, 74) with or without a stent wrapped around it, in an artery (81), said balloon, stent and artery being considered as objects of interest, and said balloon being carried by a support called a monorail (60, 70), to which two localizing features called balloon-markers (61,62; 71,72) are attached and located in correspondence with extremities of the balloon, wherein:
the extracting means (1) automatically extracts a couple of balloon-markers considered as features related to the objects of interest, which balloon-markers pertain neither to the balloon nor to the artery;
the registering means occasionally registers the balloon-markers and the related balloon and stent and artery in the images;
the modulated ridge filter means (2) enhances the borders of balloon or stent or artery while filtering the background features; and:
the display means (54) displays the images during the intervention for the user to position the balloon with or without stent in the artery, at a specific location of a portion of the artery, using the balloon-marker location information, the intervention further comprising a stage of balloon inflation and possibly of stent deployment.

13. A computer executable image processing method to be used in a system as claimed in claim 1, comprising steps of acquiring a sequence of images, steps of processing said images and steps of displaying the images in real time for a user.

14. A device comprising a suitably programmed computer or a special purpose processor having circuit means, which are arranged to process images, to be used in a system as claimed in claim 1.

15. A computer-readable medium containing a set of machine-readable instructions executable by a computer for carrying out an image processing to be used in a system as claimed in claim 1.

16. A medical examination imaging apparatus having means for acquiring a sequence of medical images and having a viewing system for processing and for displaying said sequence of images according to claim 1.

* * * * *